March 26, 1963  M. Y. WARNER  3,082,939
SUPPORT FOR A MOTOR-COMPRESSOR UNIT
Filed May 28, 1959
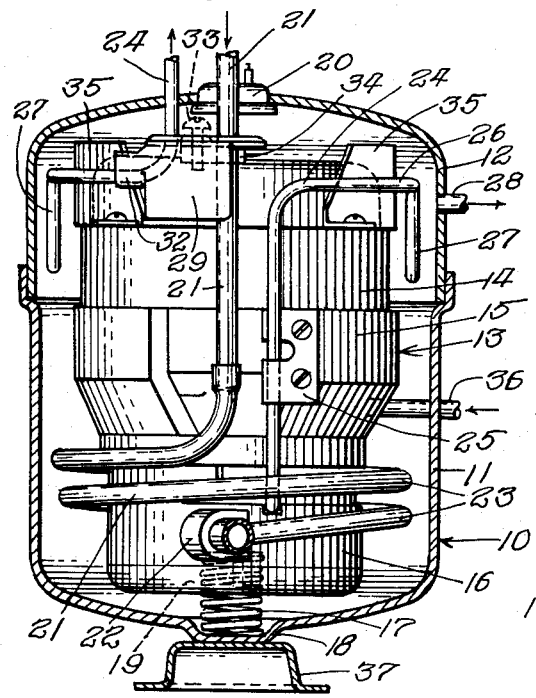
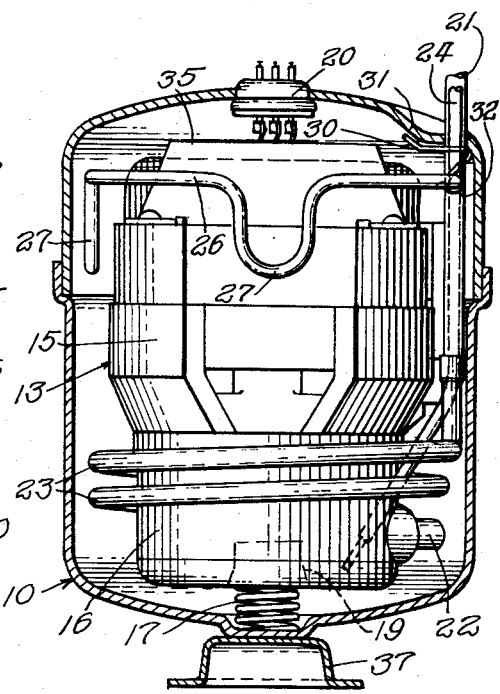
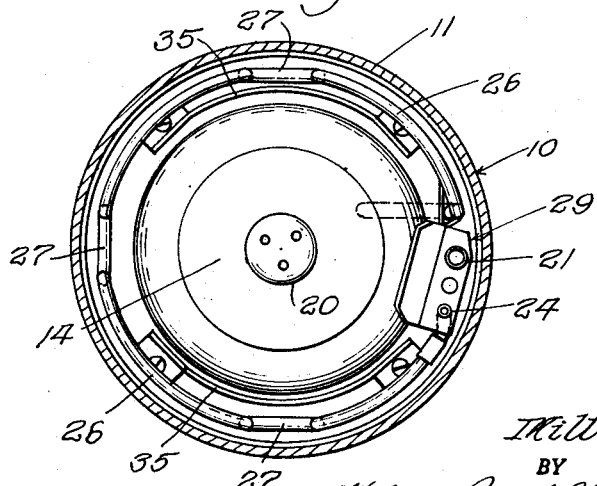
INVENTOR:
Milton Y. Warner United States Patent Office 3,082,939
Patented Mar. 26, 1963

3,082,939
SUPPORT FOR A MOTOR-COMPRESSOR UNIT
Milton Y. Warner, Evansville, Ind., assignor to Whirlpool Corporation, a corporation of Delaware
Filed May 28, 1959, Ser. No. 816,612
4 Claims. (Cl. 230—235)

This invention relates to a fluid motor-compressor assembly and particularly to a spring mounted rotary motor-compressor of the type used for compressing fluid refrigerant.

It has been customary to mount a fluid compressor such as a refrigerant motor-compressor rigidly in an enclosing casing which is preferably hermetically sealed and to mount this assembly on springs in a supporting member such as a refrigerator cabinet. With this arrangement the connecting fluid tubes to the compressor are of sufficient shape or length or both to absorb the energy of movement of the assembly such as the energy of vibration and rotation of the assembly.

It has also been proposed in a few instances to mount the compressor itself on springs within the enclosing hermetically sealed housing with a plurality of springs being located around the compressor and extending between the compressor and the housing to absorb as much as possible of the energy of vibration and rotation of the compressor.

In the structure of this invention the motor-compressor is positioned in a housing such as a hermetic housing extending around the compressor and resilient elongated supports are provided between the compressor and housing to resist lateral and torsional movement between the motor-compressor and housing. With this construction the only additional support in preferred instances is a compressible yielding support such as a spring between the compressor and housing resisting longitudinal movement therebetween but permitting lateral and torsional movement as this latter movement is resisted by the resilient elongated support. With this arrangement very little vibration is transmitted from the motor-compressor to the housing so that noise and vibration energies transmitted through the housing are kept to a minimum.

One of the features of this invention therefore is to provide an improved fluid compressor assembly comprising a motor operated compressor, a housing in which said motor-compressor is movably mounted, and a resilient elongated support between the compressor and housing resisting lateral and torsional movement therebetween by flexing of said resilient support.

Another feature is to provide an improved fluid compressor assembly comprising a motor-compressor, a housing in which said compressor is movably mounted, a resilient support between the compressor and housing resisting longitudinal movement therebetween but permitting lateral and torsional movement, and an elongated resilient support between the compressor and housing resisting lateral and torsional movement therebetween by bending or flexing of said support.

A further feature of the invention is to provide an improved fluid compressor assembly comprising a motor-compressor, a housing in which said compressor is movably mounted, a first elongated resilient support between the compressor and housing resisting lateral and torsional movement therebetween by bending of said support and located at least in part above the center of gravity of the compressor, and a second elongated resilient support between the compressor and housing resisting lateral and torsional movement therebetween by bending of said support and located at least in part below the center of gravity of the compressor.

Yet another feature of the invention is to provide an improved fluid compressor assembly comprising a motor-compressor, a housing in which said compressor and motor are movably mounted, and an elongated resilient fluid tube to the compressor between the compressor and housing resisting lateral and torsional movement therebetween by bending or flexing of said fluid tube to the compressor.

Other features and advantages of the invention will be apparent from the following description taken in conjunction with the accompanying drawings. Of the drawings:

FIGURE 1 is a vertical sectional view of a refrigerant motor-compressor assembly embodying the invention.

FIGURE 2 is a second vertical section taken through the assembly at substantially right angles to the section of FIGURE 1.

FIGURE 3 is a plan view of the assembly with the upper section of the enclosing housing removed.

In the illustrated embodiment the motor-compressor assembly comprises an enclosing hermetic housing 10 including a bottom cup-shaped section 11 and a top cup-shaped section 12 having telescoped edges that are joined together as by welding or the like to make a fluid-tight housing. Located within this housing is a motor-compressor 13 of usual and customary construction including a motor 14, a front head 15 and a rear head 16. Motor-compressor 13 is resiliently supported by a compression spring 17 immediately beneath the center of gravity of the motor-compressor 13 with the lower end of the spring being positioned within a depending well 18 in the bottom housing section 11 and the upper end of the spring 17 being positioned within a recessed well 19 in the rear head 16. The spring 17 supports the motor-compressor and resists longitudinal movement between the compressor and the housing 11. As the spring 17 is of relatively small area compared to the cross sectional area of the motor-compressor 13 the spring provides negligible resistance to lateral and torsional movement of the compressor 13 caused primarily by operation of the motor 14.

For clarity of illustration the wiring to the motor 14 and the oil inlet provisions for drawing oil from the bottom of the housing 11 into the compressor are not shown as these are conventional and form no part of the present invention. The wiring connection member 20 is shown is shown to illustrate how it cooperates with the top section 12 of the housing 10. The motor-compressor 13 has connected thereto tubes for refrigerant fluid so that the compressor can operate in the normal manner. These tubes are preferably made of steel in order that they can resist repeated bending or flexing and can provide strength needed to resist lateral and torsional stresses. The tubes can of course be made of any similar material that will not take a permanent set under the conditions of use. These tubes comprise a fluid suction tube 21 extending through the top section 12 of the housing downwardly along the side of the motor-compressor to a point adjacent the rear head 16 where the tube is wound around the compressor in the vicinity of this rear head for approximately two complete 360° turns. The lower end of this tube 21 is then connected by means of a fitting 22 to the rear head 16 in the customary manner. The suction tube 21 including the bottom coils 23 thereof is spaced from the compressor 13 between the compressor and the housing 11 so as to permit a relatively large degree of movement of the tube without contact of the tube and particularly the coils 23 with either the compressor or the housing.

The compressor is also provided with a first discharge tube 24 leading from the rear head 16 having a portion clamped by means of a tube clamp 25 attached to the compressor 13 and having an upper portion 26 adjacent the top of the motor-compressor 13 and extending around the upper portion for slightly less than 360°. This upper portion 26 is spaced from the compressor 13 and from the housing 12 in order to permit considerable movement without contacting either the compressor or the housing. The tube portion 26 is provided with three substantially equally spaced downwardly extending U-shaped sections 27 spaced about 90° apart in order to provide elongation of the over-all length of the upper tube portion 26 by flexing at the sections 27. The end of the tube 24 extends through the top of the housing 10 to an ordinary precooler (not shown). From the precooler refrigerant is returned to the housing 12 by means of tube 36 to spill into the housing. From here the refrigerant is discharged through a second discharge line 28 in the customary manner.

As can be seen the fluid lines 21 and 24 extend between the compressor 13 and the housing 10 and these extended portions are elongated and curved so as to permit bending thereof to absorb torsional and rotational movement of the compressor 13. Because the portions of the tubes 21 and 24 that extend between the compressor and the housing are elongated, preferably for a distance that is at least twice the diameter of the motor-compressor, and curved, practically none of the vibrational and rotational energy of the motor-compressor is transmitted to the housing. In a preferred form the tubes are curved and extend around the motor-compressor for at least 180°.

The upper ends of the tubes 21 and 24 are held by a tube holding bracket 29. As is shown in the drawings, the compressor 13 has a vertical axis, and the bracket 29 which attaches the tubes 21 and 24 at first portions of each to the housing 10 is spaced from this axis. This bracket is provided with an upper portion 30 curved to lie beneath a depressed portion 31 of the upper housing section 12 and a curved portion 32 that is curved around and embraces an end section of the upper portion 26 of the tube 24. The bracket 29 is provided with a screw 33 that extends through the top of the housing 10 with this screw engaging a screw holding nut 34 beneath the top portion 30 of the bracket 29. The entire bracket assembly is attached to the top portion 12 of the housing 10 by tightening screw 33, and then sealing material such as silver solder is applied to seal the head of screw 33 and the spaces between upper portion 12 of housing 10 and the tubes 21 and 24.

A second portion of tube 21 is attached to the compressor at 22, also spaced from the central axis, and a second portion of tube 24 is also attached to the compressor by the bracket 25, also spaced from the central axis.

In order to prevent excessive movement of motor-compressor 13 under conditions of extreme jarring there are provided a pair of oppositely located top bumpers 35 at the top of the compressor and located diametrically opposite each other.

As can be seen from the above description the only relatively short connection between the compressor 13 and the housing 10 is the compression spring 17. This compression spring is of relatively small cross sectional area and is located substantially beneath the center of gravity of the compressor 13. Thus it serves to absorb longitudinal vertical vibration between the compressor and the housing but is relatively non-resistant to torsional and rotational movement of the compressor 13 so that substantially none of this energy is transmitted through the spring 17 to the housing 10. Although the tubes 21 and 24 are attached to and extend between the compressor and the housing these tubes between the compressor and the housing are elongated and are curved over relatively great sections of their lengths so that the tubes will bend or flex under this torsional and rotational energy of the compressor so that relatively little of this energy is transmitted through these tubes to the housing. Thus the suction tube 21 is attached at the bracket 29 and at the fitting 22 but between these points of attachment the tube extends downwardly through the fitting 29, around the bottom part of the motor-compressor 13 beneath its center of gravity and around this bottom part for substantially two complete turns. These tubes are in effect floating free so that they can bend and move during torsional and rotational energy inputs without transmitting this energy in any substantial amounts to the housing. Similarly the first discharge tube 24 is attached to the compressor 13 at the bracket 25 and to the housing at the bracket 29 but between these points the tube extends almost completely around the top of the compressor above its center of gravity and, further, is provided with the three U-shaped bends 27 so that this tube likewise can flex without transmitting energy to the housing. As a consequence the motor-compressor is free of noise and vibration to an extremely high degree and does not require exterior spring mounting but can be mounted on a solid support such as the pedestal 37. Although the discharge return tube 36 from the precooler is of short length within the housing 10 its inner end within the housing is not attached to the compressor 13 but is free and directs the fluid refrigerant into the interior of the housing.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A fluid compressor assembly comprising: a motor operated compressor having a vertical axis, a top end, a bottom end, an intermediate portion between said ends and a center of gravity; a housing spaced from said compressor in which said compressor is movably mounted; a resilient supporting member beneath said center of gravity resisting longitudinal movement of said compressor but providing negligible resistance to lateral and torsional movement of said compressor; a first elongated resilient fluid tube to the compressor between the compressor and housing of sufficient strength for resisting lateral and torsional movement of the compressor by flexing of said tube under the forces of said movement; means for attaching a first portion of said tube to said housing at an area spaced from said axis; and means for attaching a second portion of said tube that is spaced from said first portion of said tube to said compressor at an area spaced from said axis, said flexing thereby taking place between said first and second portions of said tube, the section of said tube between said first and second portions constituting a major portion of said tube and being positioned between said compressor and housing and curving around the periphery of said intermediate portion of said compressor above said center of gravity and adjacent said top end.

2. A fluid compressor assembly comprising: a motor operated compressor having a vertical axis, a top end, a bottom end, an intermediate portion between said ends and a center of gravity; a housing spaced from said compressor in which said compressor is movably mounted; a resilient supporting member beneath said center of gravity resisting longitudinal movement of said compressor but providing negligible resistance to lateral and torsional movement of said compressor; a first elongated resilient fluid tube to the compressor between the compressor and housing resisting lateral and torsional movement of the compressor by flexing of said tube under the forces of said movement; means for attaching a first portion of said tube to said housing at an area spaced from said axis; and means for attaching a second portion of said tube that is spaced from said first portion of said tube to said compressor at an area spaced from said axis, said flexing thereby taking place between said first and second portions of said tube, the section of said tube between said first and second portions constituting a major portion of said tube and being positioned between said compressor and housing and curving around the periphery of said intermediate portion of said compressor above said center of gravity and adjacent said top end; a second elongated resilient fluid tube to the compressor between the compressor and housing resisting lateral and torsional movement of the compressor by flexing of said second tube under the forces of said movement; means for attaching a first portion of said second tube to said housing at an area spaced from said axis; and means for attaching a second portion of said second tube that is spaced from said first portion of said second tube to said compressor at an area spaced from said axis, said flexing thereby taking place between said first and second portions of said second tube, the section of said second tube between said first and second portions constituting a major portion of said second tube and being positioned between said compressor and housing and curving around the periphery of said intermediate portion of said compressor below said center of gravity and adjacent said bottom end.

3. The assembly of claim 2 wherein each of said tubes curves around said periphery for at least 180°.

4. The assembly of claim 2 wherein said first tube is provided with a plurality of reverse bends between its first and second portions to aid said flexing.

References Cited in the file of this patent

UNITED STATES PATENTS

| | | |
|---|---|---|
| 1,982,668 | Hvid | Dec. 4, 1935 |
| 2,005,354 | Still | June 18, 1935 |
| 2,139,996 | Buchanan | Dec. 13, 1938 |
| 2,178,811 | Sateren | Nov. 7, 1939 |
| 2,857,746 | Phillip | Oct. 28, 1958 |

FOREIGN PATENTS

| | | |
|---|---|---|
| 963,606 | Germany | May 23, 1957 |